Oct. 3, 1967 W. S. PEPPLER ET AL 3,344,954
STICK HANDLING MACHINE
Filed Sept. 23, 1966 3 Sheets-Sheet 1
FIG. 1.
FIG. 2.
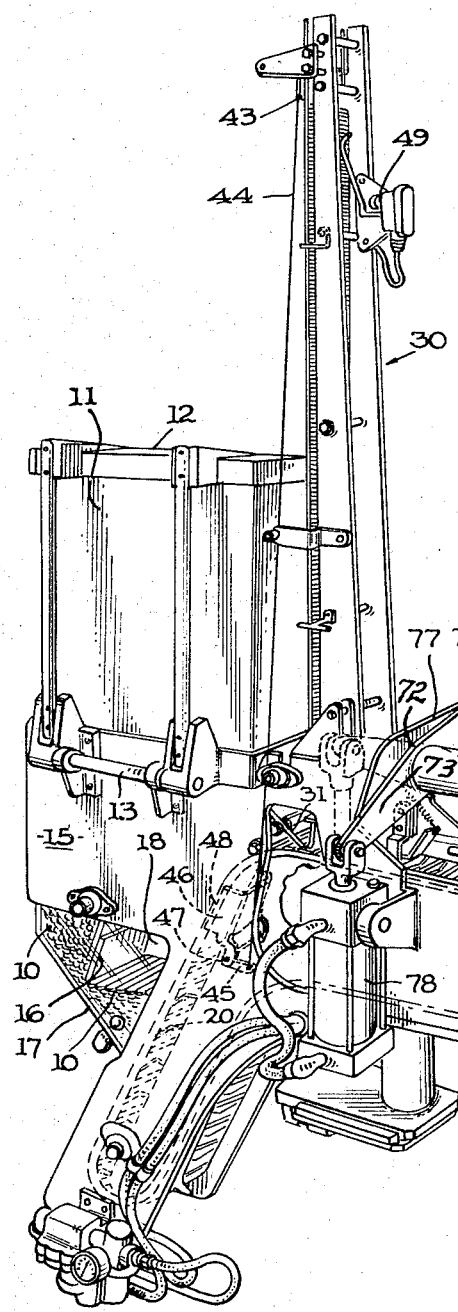
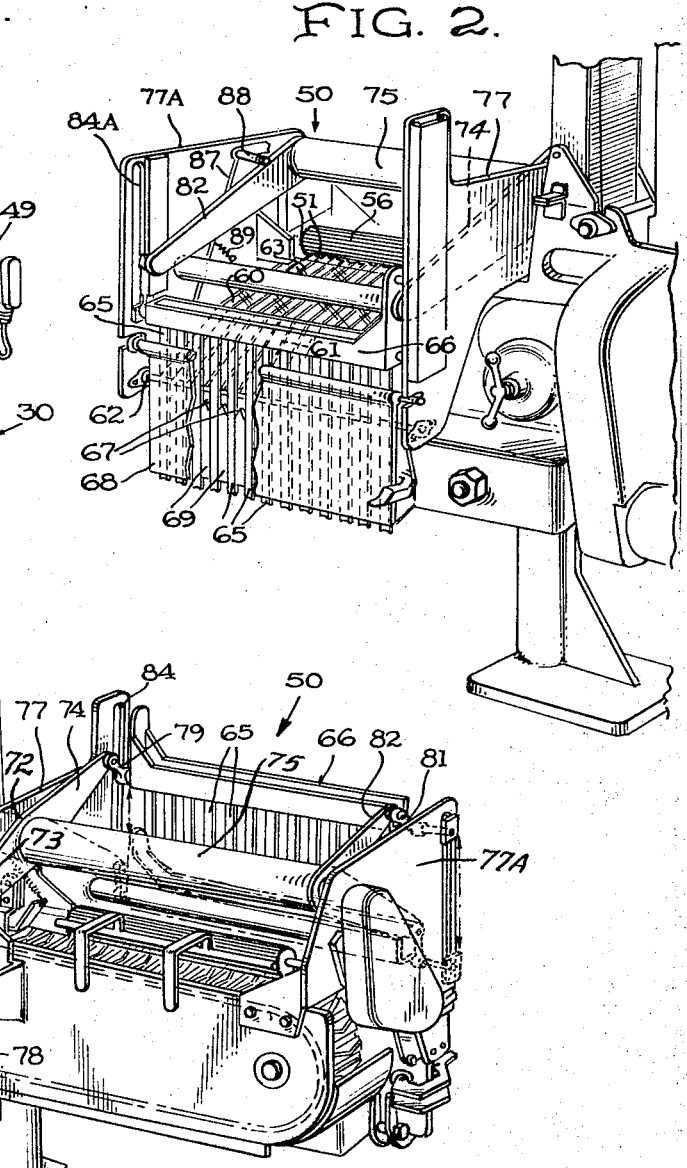
INVENTORS
WILLIAM S. PEPPLER
GEORGE N. BLISS
NORMAN A. PLANCK, JR.
BY KARL W. FLOCKS
ATTORNEY Oct. 3, 1967  W. S. PEPPLER ET AL  3,344,954
STICK HANDLING MACHINE
Filed Sept. 23, 1966  3 Sheets-Sheet 2
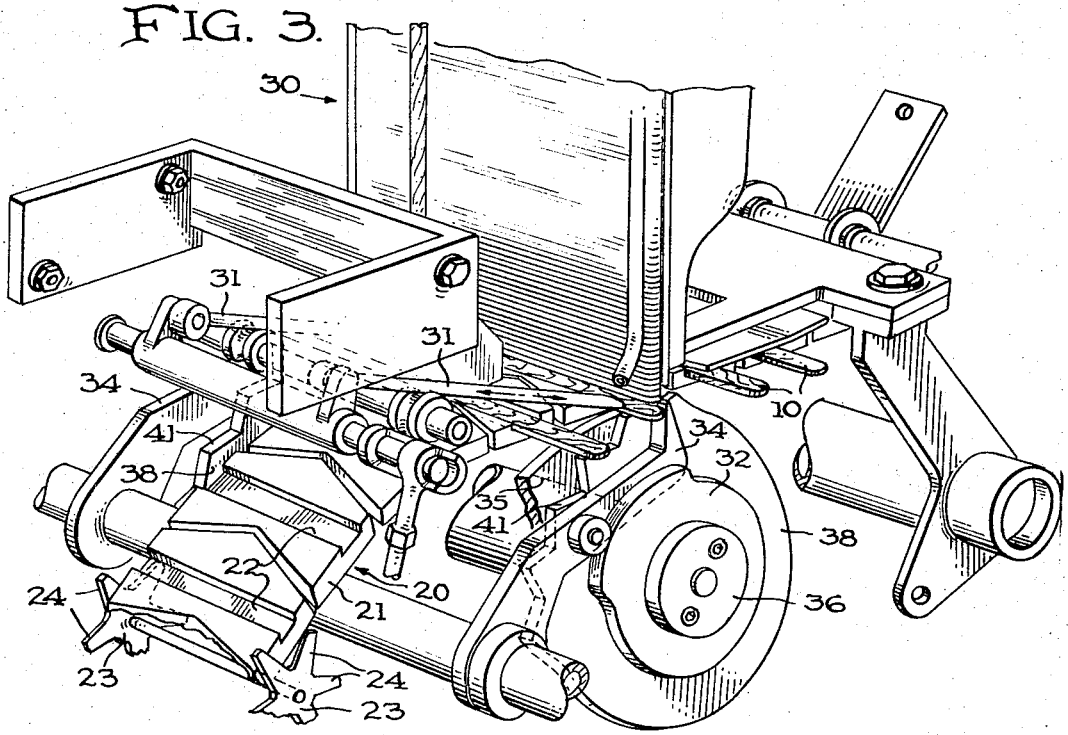
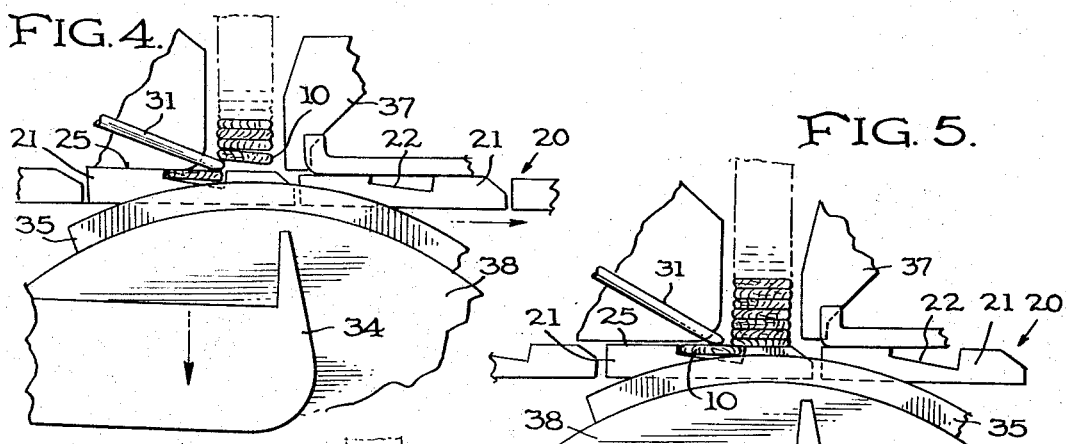
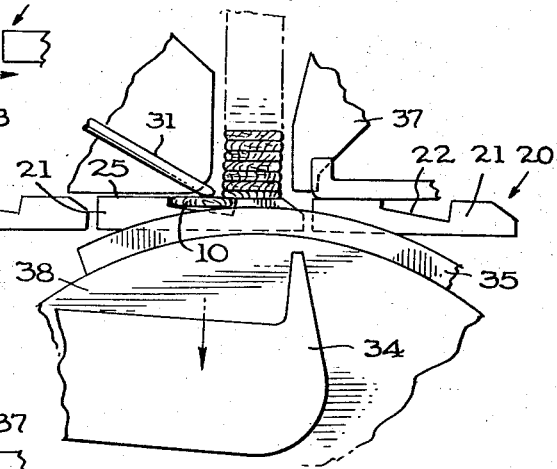
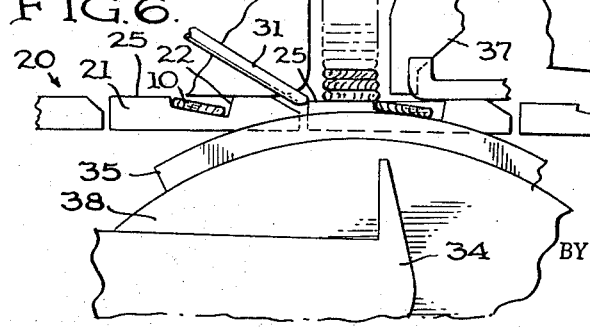
INVENTORS
WILLIAM S. PEPPLER
GEORGE N. BLISS
NORMAN A. PLANCK, JR.
BY Karl W. Flocks
ATTORNEY Oct. 3, 1967

W. S. PEPPLER ET AL 3,344,954

STICK HANDLING MACHINE

Filed Sept. 23, 1966

INVENTORS
WILLIAM S. PEPPLER
GEORGE N. BLISS
NORMAN A. PLANCK, Jr.
BY KARL W FLOCKS
ATTORNEY

United States Patent Office 3,344,954
Patented Oct. 3, 1967

3,344,954
STICK HANDLING MACHINE
William S. Peppler, Chappaqua, N.Y., and George N. Bliss, Birmingham, and Norman A. Planck, Jr., Novi, Mich., assignors to Diamond International Corporation, York, N.Y., a corporation of Delaware
Filed Sept. 23, 1966, Ser. No. 581,587
12 Claims. (Cl. 221—175)

ABSTRACT OF THE DISCLOSURE

A machine for the metering of sticks from a random supply past an oriented supply to a discharge and insertion station wherein a conveyor picks up sticks at the random supply and either refills the oriented supply or takes sticks from the oriented supply to fill empty spaces on the conveyor and in the latter case carries the sticks to a point where they are removed from the conveyor and forcefully discharged from the machine.

The invention relates to a stick handling machine and more particularly to a machine for inserting the sticks into frozen confection.

The present invention allows the metering of sticks from a random supply past an oriented supply to the discharge and insertion station of the machine where these sticks may be used to be inserted in frozen confection with greatly increased reliability over machines for this purpose in the prior art.

It is important that at the final stage of the stick handling machine that a stick be present at each insertion position since for each stick missed there is a loss of a unit of frozen confection.

The basis of the present invention is that sticks can be metered from an oriented supply with nearly perfect reliability whereas a random supply is almost always subject to erratic feeding due to crossed sticks, partial feeding and other such causes. Therefore, in the present invention there is located a supply of oriented sticks between a pickup point from a random supply and the station at which a metered discharge takes place for insertion in the units of frozen confection.

Basically, the present invention deals with a machine for producing a metered discharge of sticks such as of the type usually inserted into frozen confection comprising a random supply means, conveyor means passing the random supply means and picking up sticks therefrom, discharge means adjacent said conveyor means for discharge of the sticks from said conveyor means, and oriented supply means located along the path of said conveyor means between said random supply means and said discharge means to supply sticks missing from said conveyor means whereby said conveyor means has a full supply of sticks upon reaching said discharge means.

Also, the present invention deals with a single-ended, reversible flow reservoir means which maintains a supply of oriented sticks and insures the reliability of the machine.

Other objects and advantages will be apparent from a detailed description of the invention and from the appended drawings and claims.

In the drawings:

FIG. 1 is a perspective overall view from one side of the stick handling machine of the present invention;

FIG. 2 is a partial perspective view of the discharge end of the machine of FIG. 1 as seen from the opposite side of the machine;

FIG. 3 is an enlarged perspective view of a portion of the conveyor and the lower portion of the reservoir;

FIGS. 4, 5 and 6 depict successive steps in the metering cycle of the machine;

Figure 7:
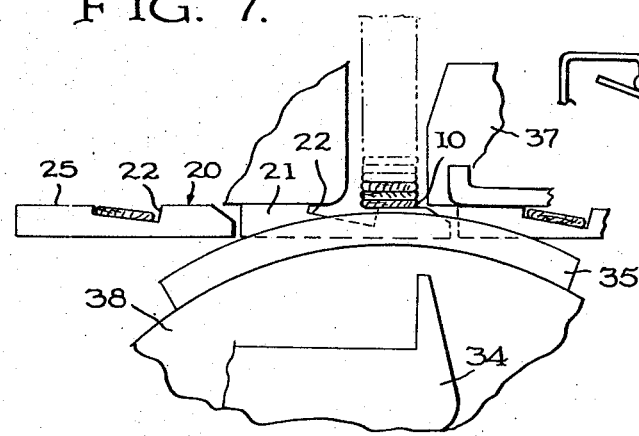
FIGS. 7 and 8 depict steps in the metering cycle of the machine when a stick is missing from the conveyor.

Referring to FIG. 1, there is shown a machine for handling sticks wherein the sticks 10 in bulk form in carton 11 are put into the machine by placing the carton in clamping means 12 which are hinged and pivoted on rod 13 and from an inverted position with the bottom open and a plate (not shown) covering the bottom, rotated into the position shown in FIG. 1, at which time the bottom plate is slid out allowing the sticks 10 to fall from carton 11 into supply hopper 15 therebelow into which they will fall in random positions. Sticks 10 in falling toward the bottom of supply hopper 15 encounter oscillating plate 16 which is positioned in relation to sloping surface 17 of hopper 15 so as to leave a gap between the end of oscillating plate 16 and sloping surface 17. The oscillation of plate 16 acts to break up "log jams" of sticks 10 which may form at the gap and also tends to maintain a constant level of sticks in pick-up chamber 18 located in the lowest portion of hopper 15 on the opposite side of the plate 16 from the portion of hopper 15 in direct communication with carton 11.

A conveyor 20 shown in more detail in FIG. 3 formed of chain links 21, each having a transverse groove 22, passes through pick-up chamber 18 at a steeply inclined angle, as depicted in dashed outline in FIG. 1, so that usually only those sticks which are fully seated in grooves 22 are carried to the upper level of conveyor 20 where it passes under reservoir 30. Due to the steep incline of conveyor 20, grooves 22 passing under reservoir 30 should either have only one stick therein or no stick. Sticks which may possibly stay on conveyor 20 in its upward travel from pick-up chamber 18 in hopper 15 due to pyramiding of the sticks in pick-up chamber 18 despite the action of oscillating plate 16 are knocked off conveyor 20 by means of a star wheel 23 whose spokes 24 reach above the level of chain links 21 between each of the grooves 22, thereby knocking back any sticks that may be lodged on those portions of the chain links 21 between grooves 22.

The machine is so cycled that for one complete cycle a predetermined number of sticks 10 is passed through the discharge and insertion portion 50 of the machine, and a predetermined number is fed to replenish the supply in reservoir 30. The action at reservoir 30 is shown in detail in FIGS. 4–10 in addition to the perspective view in FIG. 3, and will be described later in connection with a further discussion of these figures.

The conveyor then passes to the discharge and insertion portion 50 of the machine shown in views from opposite sides of the machine in FIGS. 1 and 2.

Figure 11:
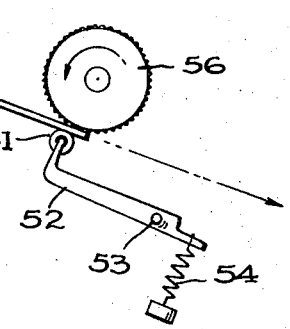
FIGS. 11 and 12 show partial views illustrating details of the discharge end of the machine of the present invention.

As the predetermined number of sticks 10 reach the discharge and insertion portion 50 of the machine, a series of wheels 51 mounted on pivotal arms 52 pivoting at point 53 and attached by a spring 54 to the machine frame are released, and under the action of springs 54 move upward to press a stick 10 thereabove against corrugated roller 56, which is continually rotating during the cycling of the machine, to lift the stick 10 off the conveyor 20 so that the end of stick 10 will hit stop bar 57 and then shoot the stick downward toward chutes 60 respectively adjacent each of the wheels 51 and roller 56. A partial detail view of this take-off apparatus is shown in FIG. 11 and this action is almost instantaneous so that the movement of conveyor 20 does not have to be slowed down in order to accomplish this step in the operation of the machine.

Figure 12:
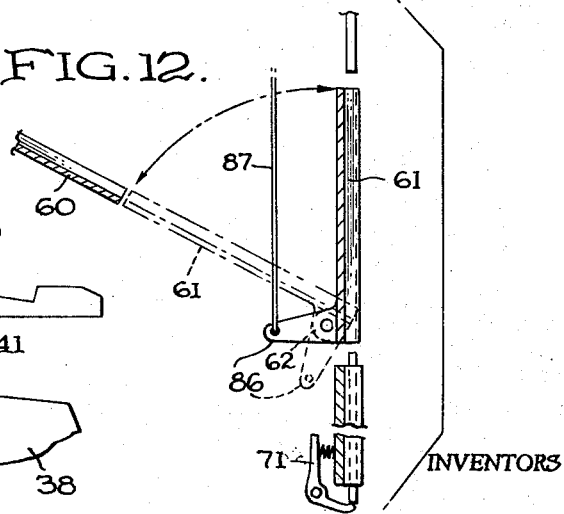

The sticks 10 then pass down the chutes 60 beneath deflector plate 63 and onto lower chutes 61 which have their bottom ends attached to a shaft 62 so attached to the machine as to rotate and at the same time raise the lower chutes 61 with the sticks 10 therein in a draw bridge fashion as shown in the dotted outline of FIG. 2 and in the detailed view of FIG. 12. At this point in the operation the support 66 carrying insertion plungers 65 is in the raised position as shown in full lines in FIG. 1, and the sticks 10 are slid down in grooves 67 adjacent front retaining plate 68 and between the separating elements 69 adjacent thereto and forming the grooves 67 below the lower chutes 61. Spring-mounted nylon fingers 71 are so placed as to hold sticks 10 in grooves 67. The sticks 10 remain in grooves 67 until the next cycle of operation of the machine takes place, at which time plungers 65 are moved downward with the downward movement of their support 66. The downward motion of the plungers 65 into grooves 67 at that time pushes the sticks 10 past the spring-mounted nylon fingers 71 into frozen confection bars placed therebelow. The plungers 65 and their supporting arms 66, 74 and 82 are then raised so as to clear the way for the next supply of sticks 10 that will be coming down the chutes 60 and 61 during that cycle of operation of the machine.

The vertical reciprocating motion of support 66 and plungers 65 attached thereto takes place through the "seesaw" action of element 72 having arms 73 and 74 mounted to extend from a hollow cylinder shaft 75 rotatably mounted on a shaft affixed to frame members 77, 77A. Arm 73 is attached on its outer end to air cylinder 78 which reciprocates that end thereby causing the outer end of arm 74 to reciprocate using shaft 75 as the fulcrum. Through linkage 79 and similar linkage 81, which is attached to the end of arm 82 having its opposite end attached to hollow cylinder 75, support 66 and plungers 65 are reciprocated in predetermined cooperation with the remainder of the machine. Vertical reciprocating movement of support 66 is guided by slots 84, 84A in frame members 77, 77A respectively.

The operation of the lower chutes 61 from their position in line with upper chutes 60 to a vertical position takes place through the operation of arm 86 attached to pivot on rotating shaft 62 and to which the bottoms of the lower chutes 61 are attached. The arm 86 is pivotally attached to rod 87 having a projection 88 on its upper end and a spring 89 attached to the rod 87 and to the side of frame members 77A to pull it to its lowered position. Upon the raising of the plungers 65 and the arm 82 associated therewith this arm 82 catches the projection 88 on the rod 87 during its upward motion and on pulling rod 87 upward causes an upward motion of one end of arm 86 and thereby rotates the bottom ends of the lower chutes 61 raising those chutes into a vertical position, as shown in full lines in FIG. 12, until during the cycle the arm is again lowered allowing the spring to pull the shaft downward, thereby again lowering the lower chutes 61 as shown in dashed outline in that same figure.

The total cycle of operation of the machine is divided into a metering cycle, at which time sticks 10 are fed from the pick-up chamber 18 of the supply hopper 15 by means of conveyor 20 to the chute 60 in the discharge and insertion portion 50 of the machine, and a filling cycle at which time the sticks 10 in the reservoir 30 are replenished from the pick-up chamber 18.

The details of the operation at the portion of the reservoir 30 shown in FIG. 3 during the metering cycle are shown in detail in FIGS. 4, 5 and 6. In these figures the grooves 22 in the chain links 21 have each been filled with a stick properly placed therein in the pick-up chamber 18 of the supply hopper 15. Just in case a stick should be missing sticks 10 are passed on conveyor 20 beneath reservoir 30. As shown in FIG. 4, a stick 10 in a transverse groove 22 approaches the portion beneath reservoir 30, passing under oscillating rods 31 which act somewhat as a shoe horn. Due to the action of cams 32, and follower wheels 33 mounted on each of fingers 34, during this portion of the cycle, the fingers 34 remain in a lowered position since they do not affect any portion of this cycle. A leveling plate 35 mounted on each side of conveyor 20 levels the stick 10 as it passes beneath the reservoir 30 and as the stick 10 advances under the reservoir 30 the oscillating rods 31 move back as shown in FIG. 5 and allow the sticks 10 in reservoir 30 to rest on stick 10 in the chain groove 22 which is now partially beneath the sticks 10 in reservoir 30. The conveyor 20 with stick 10 below the stack of sticks 10 in the reservoir 30 continues under the stack and because of the stick 10 already occupying the groove 22, the lowermost stick 10 of the stack remains above the highest surfaces 25 of the chain links 21 and slides along these surfaces being held against forward movement by fingers 37 lowered almost to the chain link highest surface 25 on the downstream side of reservoir 30. These steps continue for each of the sticks 10 that pass beneath the reservoir 30 during the metering cycle.

Figure 8:
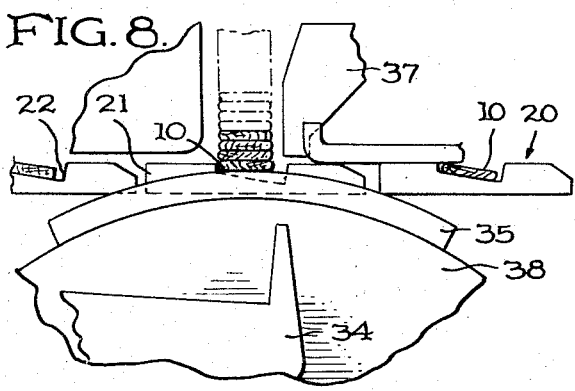

In some cases conveyor 20 passing through pick-up chamber 18 in supply hopper 15 fails to pick up a stick 10 in groove 22 of a chain link 21 and therefore this groove 22 must be filled by a stick 10 from the supply of reservoir 30 by the process shown in FIGS. 7 and 8. In FIG. 7 an empty groove 22 in conveyor 20 is approaching the bottom of reservoir 30. Since no stick 10 is in groove 22, the oscillating rods 31, unsupported by the sides of such a stick 10 that would ordinarily be in the groove 22, have dropped down to a lower level so as not to interfere with the stack of sticks 10 in reservoir 30. As empty groove 22 passes beneath the stack of sticks 10 in reservoir 30, as shown in FIG. 8, the bottom stick 10 of the stack falls into empty groove 22 but does not enter groove 22 fully at this point since the edges are still supported by leveling plates 35 located on opposite sides of chain links 21 of conveyor 20 but the stick 10 enters groove 22 sufficiently so that it will pass beneath fingers 37 mounted on the downstream side of reservoir 30. These fingers 37 prevent more than one stick 10 from staying in grooves 22 and therefore only one stick 10 is thus removed from reservoir 30 and all groove positions in the conveyor 20 are thus filled during the metering cycle.

Figure 9:
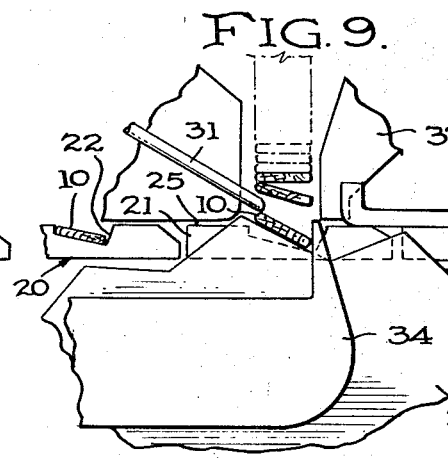
FIGS. 9 and 10 depict steps of the filling cycle at which time sticks are added to the reservoir of the machine.
Figure 10:
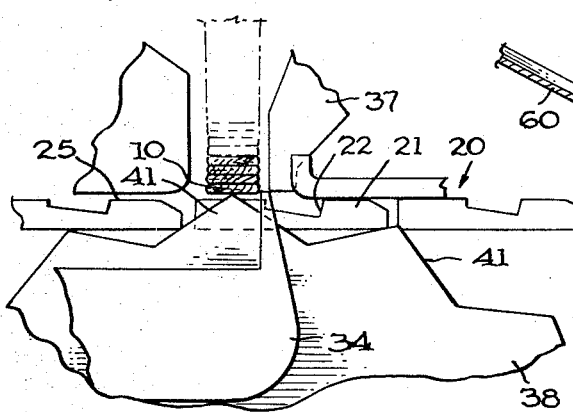

Part of the total cycle of the machine consists of the filling cycle, which portion of the total cycle is used to replenish the number of sticks 10 in the reservoir 30. This is shown in FIGS. 9 and 10. Due to a raised portion on each of cams 32, the follower wheel 33 on each finger 34 is raised and finger 34 is thus also raised as shown in FIGS. 3, 9 and 10. In conjunction with the cams 32, cams 38 mounted on the same shaft and on opposite sides of conveyor 20 have now rotated by the movement of shaft 36 so that the raised toothed portion on each of cams 38 is now beneath the reservoir 30. As shown in FIG. 9, a raised tooth 41 on each of cams 38 raises the back end of a stick resting in the groove 22 beneath the reservoir 30 while the forward motion of the stick 10 which tends to move along with the chain link 21 is stopped by the raised finger 34. The oscillating rods 31, although present with a sort of shoe-horn action, do not perform any necessary function in the filling of reservoir 30. The stick 10 is now slid from the groove 22 while being held beneath the reservoir 30 by the fingers 34, up onto the high point of a tooth 41 on each of the cams 38. At this height, it cannot fall back into the groove 22 and must remain at the bottom of the stick in the reservoir 30. As cam 38 continues its rotation, and the point of tooth 41 passes from beneath the reservoir 30, the stick 10 which was removed from the groove 22 and is now at the bottom of the reservoir 30 can rest on the high surface 25 of the chain link 21 and at this height is further prevented from passing from the reservoir 30 due to the fingers 37 downstream of the reservoir 30. This is shown in FIG. 10 wherein it will be noted that the raised finger 34 is also a preventative for the bottom stick 10 leaving the reservoir 30. A predetermined number of sticks 10 during the filling cycle are raised from the grooves 22 in the chain links 21 and replenish the reservoir 30 from the bottom so that these sticks 10 will be available during the metering cycle to replace sticks in any empty grooves 22 that were neglected to be filled in the pick-up chamber 18.

It is possible through the majority of grooves 22 being filled in the pick-up chamber 18 that the number of sticks 10 placed in the reservoir 30 during the filling cycle will cause the filling of the reservoir 30 to its capacity. When the point is reached at which the sticks 10 in the reservoir 30 have nearly filled the reservoir 30 a weight 43 resting on the topmost stick upon further upward movement causes a member (not shown) to pull upward on a cable 44 pulling upward on the end of arm 45 which causes member 46 to pivot at point 47, whereby the surface 48 of the member 46 rises on each side of the conveyor 20 above the surface of the chain links 21, thereby hitting the ends of sticks 10 which are in the grooves 22 on the incline and causing these sticks 10 to be ejected from their respective grooves 22 and fall back into the pick-up chamber 18 of supply hopper 15. These raised surfaces 48 continue to cause the sticks 10 to fall back until such time as the supply of sticks 10 in the reservoir 30 decreases, thereby lowering the weight 43 resting on the topmost stick and allowing the cable 44 to lower the arm 45 and member 46 to pivot back with its surfaces 48 below the surface of the chain links 21. Usually the level of the sticks 10 in the reservoir 30 will be lowered quite quickly when the member 46 knocks sticks 10 off the conveyor 20, since both the filling cycle will be interrupted and the supply of sticks 10 in the reservoir 30 will be used to fill empty grooves 22 in the chain links 21 as they pass under the reservoir 30. In case the sticks 10 in the reservoir 30 should drop below a predetermined level a microswitch 49 will cause an alarm to be sounded so that the operator may check the machine and see if the supply hopper 15 has been emptied or some jam has occurred to interrupt the flow from the supply hopper 15 to the reservoir 30 during the filling cycles.

It will be obvious to those skilled in the art that various changes may be made without departing from the scope of the invention and the invention is not to be considered limited to what is shown in the drawings and described in the specification.

What is claimed is:

1. A stick handling machine comprising
a random supply means;
conveyor means passing immediately adjacent said random supply means and picking up sticks therefrom;
discharge means for discharge of the sticks from said conveyor means located adjacent the opposite end of said conveyor means from said random supply means;
oriented supply means to supply sticks missing from said conveyor means located along the path of said conveyor means,
said oriented supply means being a single ended, reversible flow reservoir,
said oriented supply means including
    guide means maintaining a stacked supply of sticks in said oriented supply means above said conveyor means,
    cam means below said oriented supply means and adjacent opposite sides of said conveyor means,
    and finger means positioned in and out of the path of the sticks on said conveyor means by said cam means
whereby said conveyor means has a fully supply of sticks upon reaching said discharge means.

2. A stick handling machine comprising
a random supply means;
conveyor means passing immediately adjacent said random supply means and picking up sticks therefrom;
discharge means for discharge of the sticks from said conveyor means located adjacent the opposite end of said conveyor means from said random supply means;
oriented supply means to supply sticks missing from said conveyor means located along the path of said conveyor means,
said discharge means including
    a plurality of chutes located in side-by-side relationship to each other with their entrances adjacent said conveyor means,
    a continuously rotating roller adjacent the entrances of said chutes with its axis of rotation parallel to the direction of movement of said conveyor means,
    and roller means substantially beneath said rotating roller with its axis of rotation parallel to the direction of movement of said conveyor means and closer to said conveyor than the axis of rotation of said rotating roller.

3. A stick handling machine comprising
a random supply means;
conveyor means passing immediately adjacent said random supply means and picking up sticks therefrom;
discharge means for discharge of the sticks from said conveyor means located adjacent the opposite end of said conveyor means from said random supply means;
oriented supply means to supply sticks missing from said conveyor means located along the path of said conveyor means,
said discharge means including
    a plurality of upper chutes located in side-by-side relationship to each other with their entrances adjacent said conveyor means,
    roller means to remove the sticks from said conveyor means to said chutes,
    a plurality of lower chutes mounted for movement from a position in line with said upper chutes to a vertical position,
    a plurality of spacing means forming vertical passageways located below and in line with said lower chutes when said lower chutes are moved to a vertical position,
    a plurality of plungers mounted for movement into said passageways when said lower chutes are moved out of their vertical position.

4. The stick handling machine of claim 1 further characterized by said cam means including
a first pair of cams with each one of the pair located on opposite sides of said conveyor means,
a second pair of cams with each one of the pair located on opposite sides of said conveyor means,
each of said first pair of cams having a toothed portion thereon,
each of said second pair of cams having a raised portion thereon,
and a cam follower means on each of said finger means in operative contact with each of said respective cams of said second pair of cams,
said raised portion on each of said second pair of cams contacting a cam follower on an adjacent one of said finger means whereby said finger means is positioned in the path of the sticks on said conveyor means,
said toothed portion on each of said first pair of cams positioned beneath the stacked supply of sticks in said oriented supply means at substantially the same time that each said raised portion contacts each said corresponding cam follower.

5. The stick handling machine of claim 4 further characterized by
   a leveling plate beneath the stacked supply of sticks in said oriented supply means on each side of said conveyor means.

6. The stick handling machine of claim 1 further characterized by
   a second finger means positioned above and closely adjacent said conveyor means downstream of said oriented supply means.

7. The stick handling machine of claim 1 further characterized by
   an oscillating rod shaped means postioned to reciprocate substantially along its longitudinal axis over the surface of sticks on said conveyor means approaching said oriented supply means.

8. An oriented reversible flow supply means and conveyor feed means for sticks used for insertion in frozen confection comprising
   guide means maintaining the sticks in the supply means in stacked relation to each other,
   conveyor feed means located for movement beneath said guide means,
   means to remove one stick at a time from the bottom of the stack of sticks maintained by said guide means to said conveyor feed means located adjacent the bottom of said guide means,
   means to insert sticks one at a time from said conveyor feed means onto the bottom of the stack of sticks maintained by said guide means located adjacent the bottom of said guide means.

9. The oriented reversible flow supply means and conveyor feed means of claim 8 further characterized by
   said conveyor feed means having grooves therein,
   said means to insert sticks one at a time including
      finger means to oppose movement of the sticks past the bottom of said guide means,
      cam means to move said finger means into operative position,
      and partially toothed cam means to raise the stick from said conveyor feed means into the bottom of the stack of sticks maintained by said guide means located below said guide means and in operative relation with said cam means to move said finger means.

10. The oriented reversible flow supply means and conveyor means of claim 9 further characterized by
    said means to remove one stick at a time including
       a second finger means located adjacent said guide means in the downstream direction of the movement of said conveyor feed means above said highest surface on said conveyor feed means.

11. A method of inserting sticks into frozen confection comprising the steps of
    picking up a plurality of sticks from a random supply on a conveyor during a predetermined cycle of operation,
    feeding a portion of said plurality of sticks to a reservoir through its bottom and,
    passing a portion of said plurality of sticks past said reservoir to a discharge station,
    adding to said portion of sticks from said reservoir while passing said reservoir as needed to pass a predetermined number of sticks to said discharge station.

12. The method of inserting sticks into frozen confection as in claim 11, further comprising the steps of
    passing the sticks between rollers at said discharge station to remove them from said conveyor.

References Cited

UNITED STATES PATENTS

| | | | |
|---|---|---|---|
| 808,067 | 12/1905 | Briggs | 198—56 |
| 1,609,802 | 12/1926 | Ekstrom | 198—21 X |
| 3,038,635 | 6/1962 | Rasmusson | 221—81 |

EVON C. BLUNK, *Primary Examiner.*

EDWARD A. SROKA, *Examiner.*